Figure 1:
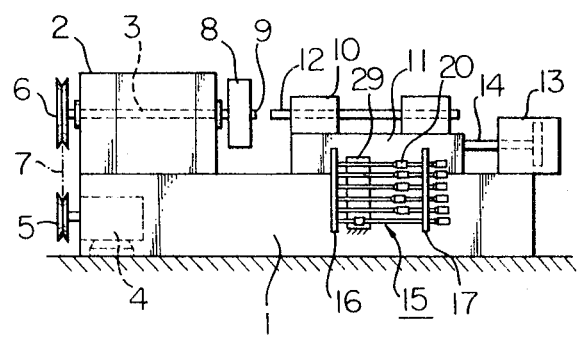

United States Patent

[11] 3,595,462

[72] Inventor Seizo Hirayama
    Kariya-shi, Japan
[21] Appl. No. 750,073
[22] Filed Aug. 5, 1968
[45] Patented July 27, 1971
[73] Assignee Kabushiki Kaisha Toyoda Jidoshokki
    Seisakusho
    Kariya-shi, Aichi-Ken, Japan
[32] Priority Aug. 5, 1967
[33] Japan
[31] 50391/67

[54] DEVICE FOR REGULATING THE OPERATIONS OF THE FRICTION WELDER
    4 Claims, 5 Drawing Figs.
[52] U.S. Cl. .................................................. 228/2,
    29/470.3, 156/73, 228/8
[51] Int. Cl. ................................................... B23k 27/00
[50] Field of Search ...................................... 29/470.3;
    228/2, 8; 156/73

[56] References Cited
    UNITED STATES PATENTS
    3,455,494  7/1969  Stamm .................... 228/2
    3,388,847  6/1968  Blum et al. ............... 228/2
    3,337,108  8/1967  Taylor ..................... 228/2
    3,235,106  2/1966  Walton .................... 228/2
    3,234,644  2/1966  Hollander ................ 29/470.3

Primary Examiner—John F. Campbell
Assistant Examiner—Robert J. Craig
Attorneys—Robert E. Burns and Emmanuel J. Lobato ABSTRACT: A regulating device for regulating the operations of a friction welder is mounted on a slide table which is slidably mounted on the base of the welder. A plurality of regulating members are mounted on the regulating device in a parallel condition, and a plurality of limit switches are disposed in a limit switch box secured to the base of the friction welder. Each regulating member comprises a shaft supported by a pair of brackets secured to the slide table, a dog slidably mounted on the feed shaft, means for providing axial movement of the feed shaft, and means for reading the relation between the set position of the feed shaft and the dog to a feeler of one of the limit switches for precisely actuating the friction welder.

PATENTED JUL 27 1971

3,595,462

DEVICE FOR REGULATING THE OPERATIONS OF THE FRICTION WELDER

The present invention relates to a device for regulating the operations of a friction welder, and more particularly, for regulating such operations by presetting the working position of actuating means which actuate the mechanism of the friction welder.

Generally, in a typical friction welding of two workpieces, a workpiece is held by a rotatable holding chuck secured to a first spindle, and another workpiece is held by a stationary holding chuck mounted on a slide table. Next, the stationary chuck is moved toward the rotatable holding chuck and the spindle is revolved. This movement of the slide table is hereinafter referred to as "forward movement." Forward movement of the slide table is performed at high speed to obtain high working efficiency. However, to prevent trouble caused by impact of the workpieces, it is required to move the slide table at a very slow speed just before contact of the workpieces. This slow speed movement of the slide table is hereinafter referred to as "slow speed movement." After contact of both workpieces, the workpiece held by the stationary chuck is pressed to the workpiece held by the rotating chuck with a predetermined axial pressure. By the above-mentioned operation, sufficient heat is generated by friction to effect a weld of the workpieces. Thereafter, the relative rotation of the workpieces is stopped and the pressure applied to the workpieces is increased until the weld is completed. This welding operation is hereinafter referred to as "upset operation." After completion of the upset operation, the first workpiece, held by the rotatable chuck, is released and the slide table is returned to its original position while carrying the welded product which is then removed from the stationary chuck. In the above-mentioned operations, it is desired to regulate the starting of the slow-speed movement of the slide table and the beginning of the upset operation. Furthermore, to obtain a satisfactory weld, the longitudinal dimension of the workpieces must be checked before starting the heat-generating operation.

For relatively simple operations, such regulation has been attempted by the combination of a horizontal shaft mounted on the slide table of the friction welder, and a plurality of dogs mounted on the shaft at positions facing a plurality of limit switches secured to the base of the friction welder.

In other attempts to achieve such regulation, for more complex operations, a pair of horizontal shafts of the regulating device are disposed to both sides of the welder, and a plurality of dogs are also mounted on the shafts in the same manner as mentioned above. The adjustment of the dogs becomes complex, however, if a large number of regulations are required for several operations of the friction welder, thereby causing interference problems between the dogs.

Recently, compactness of the welder has become desireable in order to save installation space and to provide easy operation of the welder. However, it is impossible to obtain compactness of the regulating device by the above-mentioned arrangement of the shafts. Furthermore, it is required to operate the friction welding apparatus more precisely in accordance with the enlargement of the market for such welding techniques.

The principal object of the present invention is to provide a regulating device having a centralized means for regulating the operations of the friction welder, and to provide a regulating device for the friction welder in which precise adjustments can be made.

Another object of the invention is to provide a regulating device which is disposed with respect to a certain portion of the friction welder.

Other objects and features of the invention will more fully appear from the following description and the accompanying drawings, and will be particularly pointed out in the claims.

Figure 2:
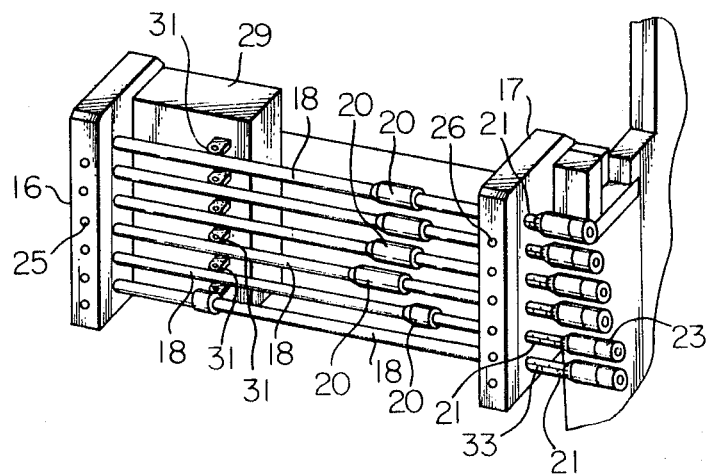
Figure 3:
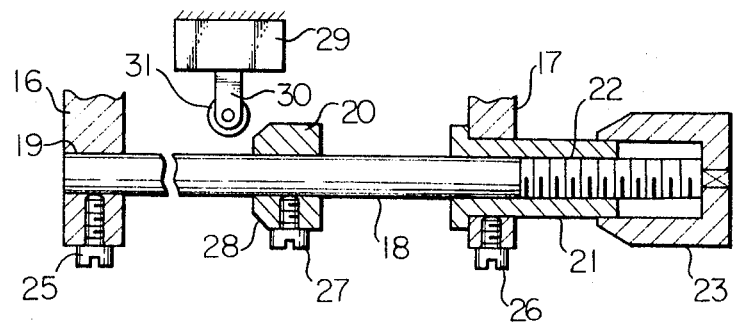
Figure 4:
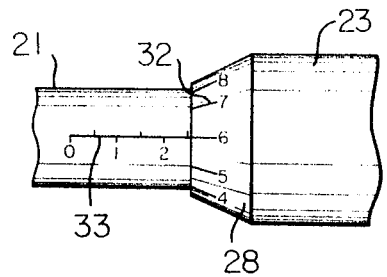
Figure 5:
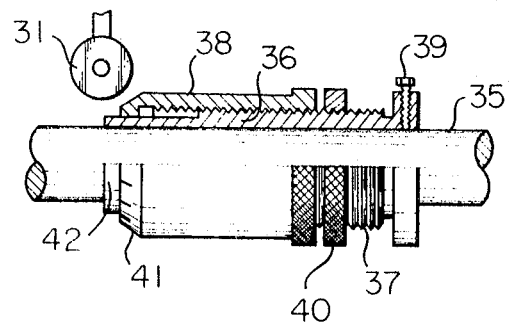

FIG. 1 is a simplified side view of a friction welder to which the regulating device of the invention is attached, FIG. 2 is a perspective view of the regulating device shown in FIG. 1, FIG. 3 is a side view, partly broken away, of an element of the regulating device shown in FIG. 2, FIG. 4 is a side view of a portion of an adjusting thimble mounted on the regulating device shown in FIG. 3, and FIG. 5 is a side view of the main portion of another embodiment of the regulating device according to the present invention.

Referring to FIGS. 1, 2, 3 and 4, in one embodiment of the invention, a regulating device is attached to a friction welder, a spindle head 2 is mounted on a base 1 of the friction welder, and a spindle 3 is rotatably supported by the spindle head 2. A motor 4 is mounted on the base 1, and the spindle 3 is driven by a belt drive mechanism comprising a pulley 5 secured to a shaft of the motor 4, a pulley 6 secured to an end of the spindle 3 and a belt 7, as shown in FIG. 1. A chuck 8 is rigidly secured to an inside end of the spindle 3, and a workpiece 9 can be rigidly supported by the chuck 8. A stationary chuck 10 is mounted on a slide table 11 slidably mounted on the base 1, and a workpiece 12 can be rigidly supported by the stationary chuck 10. A hydraulic cylinder 13 is also secured to the base 1, and an end of a piston rod 14 of the hydraulic cylinder 13 is connected to the slide table 11, so that the slide table 11 can be moved towards the spindle head 2 or away from the spindle head 2 (hereinafter called the rearward movement) by the action of the hydraulic cylinder 13. A regulating device 15 of the invention is disposed with respect to the slide table 11 that the hydraulic cylinder 13 may be so actuated and controlled by electrical signals of the regulating device 15.

The regulating device 15 comprises a pair of brackets 16 and 17 perpendicularly projected from the slide table 11, and a plurality of regulating members disposed parallel with the direction of the slide movement and supported by the brackets 16 and 17. The bracket secured to the slide table at the left side in FIG. 1 is hereinafter called the front bracket 16, and the other bracket is hereinafter called the rear bracket 17. Each regulating member comprises a shaft 18 supported by the front bracket 16, a dog 20 slidably mounted on the shaft 18, a sleeve 21 rigidly supported by the rear bracket 17, and an adjusting thimble 23 which is rotatably engaged with the outer surface of the sleeve 21 and fixedly connected with the end of the shaft 18 by a setscrew. One end of the shaft 18 is received in an aperture 19 of the front bracket 16 in such a way that the end of the shaft 18 is turnably and slidably supported by the aperture 19. The sleeve 21 engages with a threaded portion 22 of the other end of the shaft 18 as shown in FIG. 3. Setscrews 25 and 26 are used for respectively setting the shaft 18 to the front bracket 16, and the sleeve 21 to the rear bracket 17. Furthermore, a setscrew 27 is used for setting the dog 20 to the shaft 18. Therefore, when the setting of the shaft 18 to the front bracket 16 is released by loosening the setscrew 25, and the adjusting thimble 23 is turned by manual operation, the shaft 18 can be moved along its axis by the turning motion of the shaft 18 by way of the rotation of the adjusting thimble 23.

A limit switch box 29 is mounted to the base 1 of the friction welder, and a plurality of limit switches 30 are mounted in the limit switch box 29. Feeler 31 of each limit switch 30 is projected toward the path of its respective dog so as to contact with a tapered portion 28 on the forward portion of the dog 20 when the dog 20 is moved together with the slide table 11. Each of the set positions of the dogs 20 is independently selected as is explained in detail hereinafter.

In the present embodiment of each shaft 18, the threaded portion 22 is provided with threads having a certain pitch designated by "P." Consequently, when its adjusting thimble 23 is turned one round, the shaft 18 is moved in the forward direction or rearward direction by the same distance as pitch P. To obtain a precise setting of the shaft 18 together with the dog 20, a vernier scale is provided on the engaging portions of the sleeve 21 and the adjusting thimble 23. That is, a round scale 32 is marked on the tapered portion 28 of the adjusting thimble 23, with equal intervals, and a lateral scale 33 is marked on the sleeve 21 as shown in FIG. 4. If the pitch P equals 1 mm. and the scale 33 is provided with 10 intervened marks made with equal interval, the shaft 18 can be moved in its axial direction by 1 mm. when the adjusting thimble 23 is turned one round. The adjusting thimble 23 can be turned precisely by watching the relative position of the marks 32 and 33. Consequently, a very precise setting of the position of the shaft 18 together with the dog 20 can be obtained by using of this vernier scale.

In the operation of the device, the slide table 11 is shifted in the forward direction 8 and stopped at a position where the workpieces 9 and 12 contact each other. This position is hereinafter called the "original working position" of the adjusting member of the invention. After movement of the slide table 11 to the original working position, the fastening of the dog 20 to the shaft 18 by the setscrew 27 is released and next the dog 20 is moved to a position adjacent the feeler 31 of the limit switch 30, whereupon the dog 20 is again secured to the shaft 18 by the setscrew 27. Next, the fastening of the shaft 18 to the front bracket by the setscrew 25 is released, and the shaft 18 is moved in the forward direction by turning the adjusting thimble 11. When the tapered portion 28 of the dog 20 contacts the feeler 31 of the limit switch 30, a certain signal such as a red lamp or a buzzer is actuated to indicate the operating position of the limit switch 30, and the vernier scale is read at this position.

After the above-mentioned procedure, the adjusting thimble 23 is turned to the opposite direction to move the feed shaft 18 in the backward direction, and when a predetermined distance of the backward movement which corresponds to the beginning of the upset operation of the friction welding is detected by the vernier scale of the adjusting thimble 23 and the sleeve 21, the shaft 18 is fastened to the front bracket 16 by the setscrew 25. By the above-mentioned setting operation of the shaft 18 and the dog 20 against the limit switch 30, the beginning of the upset operation of the friction welding can be set precisely. In other words, the upset movement of the slide table 11 is regulated precisely by the action of the limit switch 30 and the dog 20 of the regulating device 15 of the invention because the actuation of the hydraulic cylinder 13 is precisely controlled by the electrical signal of the limit switch 30 caused by the contact of the dog 20 with the feeler 31 of the limit switch 30.

The other shafts and dogs of the device can be set by the same general procedure as mentioned above, for regulating the entire operation of the friction welder. For example, the shaft and dog of the regulating member for regulating the starting of the slow speed movement of the slide table 11 can be set in the same way as mentioned above by locating the desired position for the beginning of such slow speed movement.

When it is necessary to check the longitudinal dimension of the workpieces, a pair of workpieces having standard length are prepared and held by the chucks 8 and 10, and the slide table 11 is moved toward the forward direction so as to bring the standard workpieces into contact with each other. At this position, dogs 20 mounted on two shafts 18 are moved to the position adjacent to the feelers 31 of the limit switches 30 after releasing the fastening of their respective setscrews 27. Then these dogs 20 are secured to the shafts 18 respectively by the setscrews 27. Next, the fastening of the setscrews 25 is released, and shafts 18 are moved toward the forward direction by turning the adjusting thimbles 23 until there is contact of the taper portion of the dogs 20 with the feelers 31 to actuate the limit switches 30. The above-mentioned movements of the shafts 18 are performed separately. The contact position of the dog 20 with the feeler 31 of the limit switch 30 is read by the scale of the adjusting thimble 23 and the sleeve 21, for both shafts 18. Then the slide table 11 is shifted in the rearward direction for a certain distance, and the upper regulating member is used for defining the upper tolerance of the total length of the workpieces. In this case the shaft 18 is moved to the forward direction by turning the adjusting thimble 23 until the reading of the vernier scale shows the forward movement of the shaft 18 corresponding to a predetermined upper tolerance. Then the upper shaft is secured to the front bracket by the setscrew 25. The setting of the shaft and its dog for defining the lower tolerance can be performed by the same way as the manner of setting the upper tolerance except an opposite turning of the adjusting thimble 23 is performed, which causes the lower shaft 18 to move in the rearward direction. Therefore, when the slide table 11 is moved to the forward direction after holding the workpieces by the chucks 8 and 10, if the total length of the workpieces is longer than the upper limitation defined by the upper tolerance, the workpieces contact each other before contacting the dog 20 with the feeler 31 of the limit switch 30, and if the total length of the workpieces is shorter than the lower limitation defined by the lower tolerance, the dog 20 of the lower regulating member contacts the feeler 31 of the limit switch 30 before the workpieces contact each other. In the above-mentioned two cases, the total length of the workpieces is detected as being incorrect, and the rotation of the spindle 3 is stopped and the workpieces are released and taken from the chucks 8 and 10. The above-mentioned test of the length of the workpieces can be applied very easily for testing the length of the product of the friction welding.

As it is clearly shown in the drawings, a plurality of shafts are disposed to the regulating device in a superimposed and parallel condition. Consequently, in case of controlling a plurality of different performances of the friction welding by the regulating members of the invention, any interference for setting position of the dogs of the regulating members can be completely prevented. Thus, a very compact regulating device for regulating the operations of the friction welder can be provided by the present invention. Further, it must be noticed that the friction welding operations are performed precisely and automatically in sequence by applying the regulating device having a plurality of regulating members according to the present invention.

Referring to FIG. 5, another embodiment of the regulating device of the invention comprises a shaft 35 and a sleeve 36 supported by the shaft 35, and a dog 38 engaged with the threaded portion 37 of the sleeve 36 by way of thread engagement. The sleeve 36 can be secured to the shaft 35 by the setscrew 39, and as mentioned above, the dog 38 can be moved in the axial direction. A locking nut 40 is also engaged with the threaded portion 37 of the sleeve 36 as shown in FIG. 5, and the set position of the dog 38 can be fixed by fastening the locking nut 40 to the dog 38. At the tapered portion of the dog 38 and the portion of the sleeve 37 facing to the feeler 31, marks 41 and 42 of a vernier scale are provided, respectively, in the same way as shown in FIG. 4. In this embodiment, the shaft 35 is always secured to the front bracket 16 and bracket 17. The setting of the dog 38 to the feed shaft 37 is made as follows: After movement of the slide table 11 at the original working position, the fastening of the sleeve 37 to the shaft 35 is released by the setscrew 39, and next the sleeve 36 is moved to a position adjacent to the feeler 31. Then the sleeve 37 is secured to the shaft 35 by fastening the setscrew 39. After setting the sleeve 37 to the shaft 35, the locking nut 40 is released and the dog 38 is turned so as to move in the forward direction. When the tapered portion of the dog 38 contacts with the feeler 31 of the limit switch 30, a signal is sent in the same manner as described in the first embodiment, and the vernier scale is read at this position. After the above-mentioned operation, the dog 38 is turned in the opposite direction to move it in the backward direction, and when a predetermined distance of the backward displacement which corresponds to the beginning of the upset operation of the friction welding is detected by the vernier scale of the dog 38 and the sleeve 42, the dog 38 is locked to the sleeve 38 by the locking nut 40.

Obviously many modifications and variations concerning this invention are possible in the light of the above teachings. It is therefore to be understood that this invention may be practiced otherwise than as described.

What I claim is:

1. In an improved friction welder including a base, a slide table and a spindle head mounted on the base, a spindle rotatably mounted on the spindle head and having means connected thereto for rotating the spindle, drive means mounted on the base and connected to the slide table for moving the slide table toward and away from the spindle, and a plurality of switches mounted on the base and having mechanical actuators, said switches being connected to the drive means for controlling the movement of the slide table by said drive means, wherein the improvement comprises:

a regulating device for said drive means, said device including a pair of brackets mounted on said slide table, a plurality of regulating members mounted in parallel on said brackets and aligned with the direction of movement of said slide table, a corresponding plurality of dogs mounted on said regulating members and disposed with respect to said mechanical actuators of said switches to actuate said switches upon movement of said slide table, and adjustable means on each said regulating member for precisely adjusting the positions of said dogs with respect to said slide table, whereby said dogs are positioned to actuate said switches at precise points of travel of said slide table to control said drive means.

2. An improved friction welder as set forth in claim 1, in which each said regulating member comprises a shaft having one of said dogs and one of said adjustable means mounted thereon, and in which said adjustable means on each said shaft includes means for reading the position of contact of the dog on that shaft with its respective switch actuator.

3. An improved friction welder as set forth in claim 2, further comprising a plurality of sleeves having internal threads and being mounted on one of said brackets, said shafts are threadably received at one in said respective sleeves and received at their other ends in the other of said brackets, said adjustable means comprising a plurality of thimbles mounted respectively for axial sliding movement on said sleeves, each said thimble being fixed to its respective shaft for rotating said shaft, and in which said means for reading the position of contact of the dogs with the switch actuators includes markings on said sleeves and thimbles comprising vernier scales.

4. An improved friction welder as set forth in claim 2, further comprising a plurality of sleeves mounted respectively on said shafts, each said sleeve having an externally threaded portion and having a reduced smooth portion at one end, and in which each said dog comprises a thimble having internal threads and being received respectively on said threaded portions of said sleeves for adjustable movement along said sleeves, each sleeve having a locking nut thereon for locking said thimbles in position on said sleeves, and in which said means for reading the position of contact of the dogs with the switch actuators includes markings on said sleeves and thimbles comprising vernier scales.